US006578032B1

(12) United States Patent
Chandrasekar et al.

(10) Patent No.: US 6,578,032 B1
(45) Date of Patent: Jun. 10, 2003

(54) METHOD AND SYSTEM FOR PERFORMING PHRASE/WORD CLUSTERING AND CLUSTER MERGING

(75) Inventors: Raman Chandrasekar, Redmond, WA (US); David W. Steinkraus, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 09/605,404

(22) Filed: Jun. 28, 2000

(51) Int. Cl.[7] ............................................. G06F 17/30
(52) U.S. Cl. ...................................................... 707/6
(58) Field of Search ........................ 707/109.1, 3, 100, 707/4, 6; 709/5; 705/8

(56) References Cited

U.S. PATENT DOCUMENTS

| | | | | |
|---|---|---|---|---|
| 4,837,831 A | * | 6/1989 | Gillick et al. | 704/240 |
| 5,404,510 A | * | 4/1995 | Smith et al. | 706/934 |
| 5,619,709 A | * | 4/1997 | Caid et al. | 704/9 |
| 5,799,268 A | * | 8/1998 | Boguraev | 704/10 |
| 5,857,179 A | * | 1/1999 | Vaithyanathan et al. | 707/2 |
| 6,081,774 A | * | 6/2000 | de Hita et al. | 704/9 |
| 6,182,077 B1 | * | 1/2001 | Tokumine et al. | 707/10 |
| 6,389,436 B1 | * | 5/2002 | Chakrabarti et al. | 707/3 |

OTHER PUBLICATIONS

Frakes, *Information Retrieval/Data Structures & Algorithms*, Chapter 8, 136–138.
Cutting, et al., "Scatter/Gather: A Cluster–based Approach to Browsing Large Document Collections", *15th Ann Int'l. ACM/SIGIR Conference '92/Denmark–6/92*, 1992, 318–329.
Willett, "Recent Trends In Hierarchic Document Clustering: A Critical Review", *Information Processing & Management*, vol. 24, No. 5, 1988, 577–597.
IBM Worldwide Website, Intelligent Miner for Text—Clustering, http://www–4.ibm.com/software/date/iminer/fortext/cluster/cluster.html, printed Sep. 8, 2000, 2 pages.

\* cited by examiner

*Primary Examiner*—Safet Metjahic
*Assistant Examiner*—Sana Al-hashemi
(74) *Attorney, Agent, or Firm*—Woodcock Washburn LLP

(57) ABSTRACT

Text classification has become an important aspect of information technology. Present text classification techniques range from simple text matching to more complex clustering methods. Clustering describes a process of discovering structure in a collection of characters. The invention automatically analyzes a text string and either updates an existing cluster or creates a new cluster. To that end, the invention may use a character n-gram matching process in addition to other heuristic-based clustering techniques. In the character n-gram matching process, each text string is first normalized using several heuristics. It is then divided into a set of overlapping character n-grams, where n is the number of adjacent characters. If the commonality between the text string and the existing cluster members satisfies a pre-defined threshold, the text string is added to the cluster. If, on the other hand, the commonality does not satisfy the pre-defined threshold, a new cluster may be created. Each cluster may have a selected topic name. The topic name allows whole clusters to be compared in a similar way to the individual clusters, and merged when a predetermined level of commonality exists between the subject clusters. The topic name also may be used as a suggested alternative to the text string. In this instance, the topic name of the cluster to which the text string was added may be outputted as an alternative to the text string.

17 Claims, 10 Drawing Sheets

METHOD AND SYSTEM FOR PERFORMING PHRASE/WORD CLUSTERING AND CLUSTER MERGING

TECHNICAL FIELD

The present invention relates to the field of text classification. More specifically, the present invention relates to the grouping of words and phrases into clusters of related words and phrases.

BACKGROUND OF THE INVENTION

Clustering is a statistical process that attempts to find common structures in a collection of items. In so doing, clustering separates the entire collection of items into discrete groups whose members have some common feature. Often, a threshold level of commonality is used to determine which items will be grouped together with a certain topic name. An item that does not satisfy the threshold either may be grouped with another cluster or forced to begin a new group. This process continues until all items have been considered.

Clustering is a common and especially helpful technique for organizing large collections of data. In the life sciences, clustering is used to catalogue various life forms, such as plants and animals, into species and subspecies categories. Also, clustering is widely used in information sciences to organize text and numbers. For example, where the collection of items are text-based documents, clustering may create groups of documents based on the commonality of individual words or phrases within the documents. This type of clustering may allow the grouping of "civil war"-related documents, for example.

For some time, numeric and document clustering had to be accomplished manually by human editors who reviewed and scored each item to determine where it would be catalogued. However, with the advent of the computer, automated grouping via clustering algorithms has made it easier to update clusters that require continual additions.

The recent advent of the Internet and electronic word processing has created an increased need for automated clustering of words and phrases. Specifically, Internet search engines, electronic thesauruses, and electronic spell checkers, for example, operate on short phrases or individual words. In the context of Internet search engines, a user inputs a short phrase or single-word query. The search engine then searches the Internet or a categorization of web sites, looking for web pages containing words or phrases similar to the query. Most search engines do not require the web page to contain exact matching content. However, prior art search engines are limited by the accuracy of the query that is inputted. For example, misspellings, missing quotations, and other related errors, often cause the search engine to return with no results or irrelevant results. Therefore, it would be beneficial to provide an automated clustering technique that finds commonality amongst single words or phrases, and places the words or phrases into discrete groups. In this way, the clusters may be used to provide alternative words or phrases to a user or directly to a search engine, for example.

SUMMARY OF THE INVENTION

Text classification has become an important aspect of information technology. Present text classification techniques range from simple text matching to more complex clustering methods. Clustering describes a process of discovering structure in a collection of characters. The invention automatically analyzes a text string and either updates an existing cluster or creates a new cluster. To that end, the invention may use a character n-gram matching process in addition to other heuristic-based clustering techniques. In the character n-gram matching process, each text string is first normalized using several heuristics. It is then divided into a set of overlapping character n-grams, where n is the number of adjacent characters. If the commonality between the text string and the existing cluster members satisfies a pre-defined threshold, the text string is added to the cluster. If, on the other hand, the commonality does not satisfy the pre-defined threshold, a new cluster may be created. Each cluster may have a selected topic name. The topic name allows whole clusters to be compared in a similar way to the individual clusters or strings, and merged when a predetermined level of commonality exists between the subject clusters. The topic name also may be used as a suggested alternative to the text string. In this instance, the topic name of the cluster to which the text string was added may be outputted as an alternative to the text string.

More specifically, the invention provides a method, system and computer-readable medium having computer-executable instructions for clustering character strings. Each character string comprises a word or a phrase. The method comprises the steps of receiving at least one character string, and clustering a first character string with another character string into one or more groups, when the first character string satisfies a predetermined degree of commonality with one or more character strings in each of these groups. When the first character string does not satisfy the predetermined level of commonality with another character string, another group is created. The method also selects at least one of the character strings in each of the groups to be the group's topic name. Selection of the topic may be based on a pre-designation or a frequency of the received character strings with the groups. The selected topic may then be outputted.

The invention may be used to suggest alternative words for text-based activity, like Web page searches and spell-checking applications. In the case of Web page searches, when a user enters a misspelled search term or a spelling variant such as a common abbreviation that sufficiently matches an existing cluster, the cluster's topic may be searched instead of the misspelled query. In the context of spell-checking applications, commonly found in word processors, when the invention receives a user's misspelled word, it may return the cluster's topic, representing a collection of correctly spelled words.

BRIEF DESCRIPTION OF THE DRAWINGS

Other features of the invention are further apparent from the following detailed description of presently preferred embodiments of the invention taken in conjunction with the accompanying drawings, of which.

DETAILED DESCRIPTION OF THE INVENTION

Overview

In the past, the pursuit of commerce and leisure activities did not require consumers to spell or even correctly pronounce the product or service they desired. Instead, consumers would be presented with the desired product or service (and its correct spelling) simply by visiting a local retail store, contacting a service provider, or browsing a telephone directory. However, the text-based nature of e-commerce, and information technology generally, has required consumers to become more familiar with product names and their spelling in order to find the products they desire. In particular, search engines are dependent on the accuracy of the inputted query. Misspellings, missing quotations, and other related errors, often cause the search engine to return with no results or irrelevant results.

This level of familiarity is especially difficult to achieve in commerce transactions, where average consumers are forced to identify trademarked names not commonly found in their language. For example, "pokemon" is the name of a popular collection of children's toys and collectibles. Yet, "pokemon" (a combination of "pocket" and "monster") is not a word commonly found or understood in the English language. A consumer familiar with the "pokemon" product, but not its spelling, may abandon his/her search on the Internet after repeated misspellings fail to return any results. Therefore, it has become an important part of everyday life to relate the misspellings of certain words or phrases, not necessarily found in the any language, to their correct spelling. Text classification and clustering help accomplish this task.

Operating Environment

Figure 1:
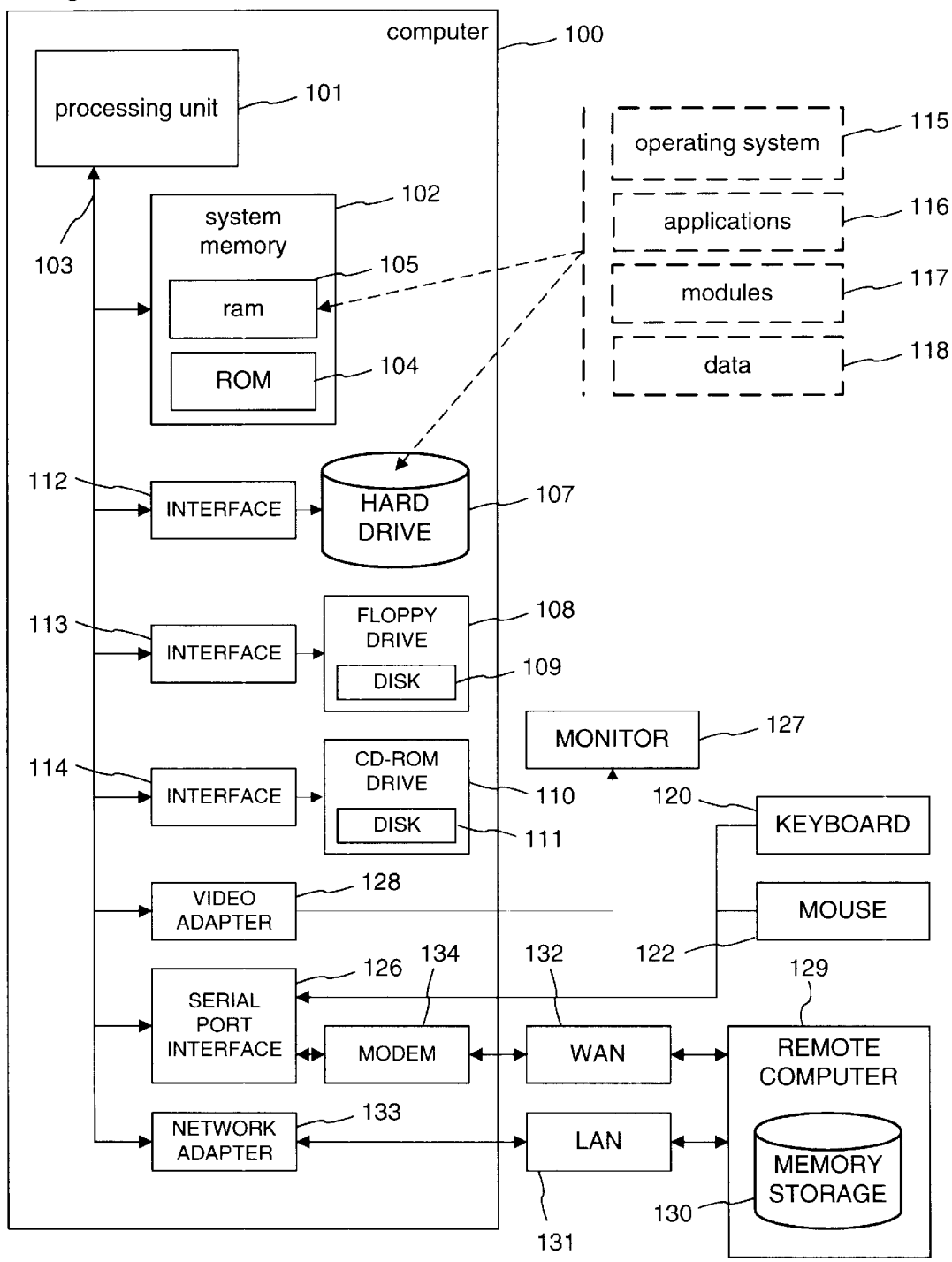
FIG. 1 is a block diagram of a suitable computing environment in which the present invention may be implemented.

FIG. 1 and the following discussion are intended to provide a brief, general description of a suitable computing environment in which the invention may be implemented. While the invention will be described in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. However, some embodiments of the invention can be practiced on standalone computers. In a distributed computing environment, program modules may be located in both local and remote memory storage devices.

With reference to FIG. 1, one system for implementing the invention includes a conventional personal computer 100, including a processing unit 101, a system memory 102, and a system bus 103 that couples various system components including the system memory to the processing unit 101. Processing unit 101 may be any of various commercially available processors. Dual microprocessors and other multiprocessor architectures also can be used as processing unit 101.

System bus 103 may be any of several types of bus structure including a memory bus or memory controller, a peripheral bus, and a local bus using any of a variety of conventional bus architectures. System memory 102 includes read only memory (ROM) 104 and random access memory (RAM) 105. A basic input/output system (BIOS), containing the basic routines that help to transfer information between elements within the personal computer 100, such as during start-up, is stored in ROM 104.

Personal computer 100 further includes a hard disk drive 107 and a magnetic disk drive 108 to read from or write to a removable disk 109, and an optical disk drive 110 to read a CD-ROM disk 111 or to read from or write to other optical media. Hard disk drive 107, magnetic disk drive 108, and optical disk drive 110 are connected to system bus 103 by a hard disk drive interface 112, a magnetic disk drive interface 113, and an optical drive interface 114, respectively. The drives and their associated computer-readable media provide nonvolatile storage of data, data structures, computer-executable instructions, etc. for personal computer 100. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the operating environment.

A number of program modules may be stored in the drives and RAM 105, including an operating system 115, one or more application programs 116, other program modules 117, and program data 118.

A user may enter commands and information into personal computer 100 through a keyboard 120 and pointing device, such as a mouse 122. Other input devices (not shown) may include a microphone, joystick, game pad, satellite dish, scanner, or the like. These and other input devices are often connected to processing unit 101 through a serial port interface 126 that is coupled to system bus 103, but may be connected by other interfaces, such as a parallel port, game port or a universal serial bus (USB). A monitor 127 or other type of display device is also connected to system bus 103 via an interface, such as a video adapter 128. In addition to monitor 127, personal computers typically include other peripheral output devices (not shown), such as speakers and printers.

Personal computer 100 may operate in a networked environment using logical connections to one or more remote computers, such as a remote computer 129. Remote computer 129 may be a server, a router, a peer device or other common network node, and typically includes many or all of the elements described relative to personal computer 100, although only a memory storage device 130 has been illustrated in FIG. 2. The logical connections depicted in FIG. 2 include a local area network (LAN) 131 and a wide area network (WAN) 132. Such networking environments are commonplace in offices, enterprise-wide computer networks, intranets and the Internet.

When used in a LAN networking environment, personal computer 100 is connected to local network 131 through a network interface or adapter 133. When used in a WAN networking environment, personal computer 100 typically includes a modem 134 or other means for establishing communications over wide area network 132, such as the Internet. Modem 134, which may be internal or external, is connected to system bus 103 via serial port interface 126. In a networked environment, program modules depicted relative to personal computer 100, or portions thereof, may be stored in the remote memory storage device. It,will be appreciated that the network connections shown are one example, and that other means of establishing a communications link between the computers may be used.

In accordance with the practices of persons skilled in the art of computer programming, the present invention is described below with reference to acts and symbolic representations of operations that are performed by the personal computer 100, unless indicated otherwise. Such acts and operations are sometimes referred to as being computer-executed. It will be appreciated that the acts and symbolically represented operations include the manipulation by the processing unit 101 of electrical signals representing data bits which causes a resulting transformation or reduction of the electrical signal representation, and the maintenance of data bits at memory locations in the memory system (including the system memory 102, hard drive 107, floppy disks 109, and CD-ROM 111) to thereby reconfigure or otherwise alter the computer system's operation, as well as other processing of signals. The memory locations where data bits are maintained are physical locations that have particular electrical, magnetic, or optical properties corresponding to the data bits.

Client-Server System with Search Engine

Figure 2:
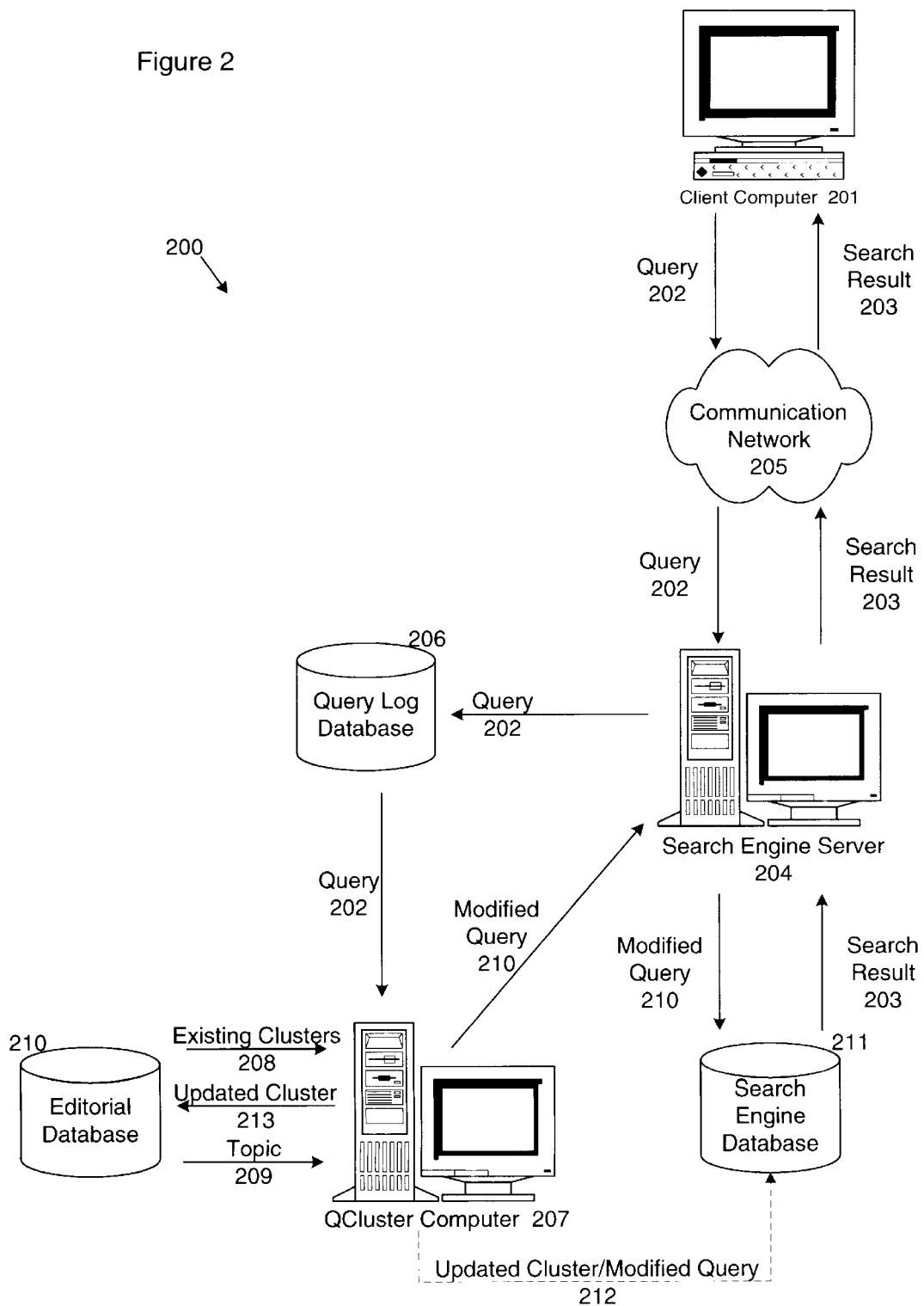
FIG. 2 is a block diagram of a client-server system in which a search engine server is queried by a user, according to the present invention.

FIG. 2 is a block diagram of a client-server system in which the present invention may be implemented. Client-server system 200 includes a client computer 201 coupled to a communication network 205. Client computer 201 may comprise a personal computer (as shown in FIG. 1) that has an extensible markup language (xml) and/or hypertext markup language (html)-based browser software installed thereon, for example, INTERNET EXPLORER available from MICROSOFT Corporation. Communication network 205 may be a LAN or WAN, for example, the Internet. It should be understood that while one client computer 201 is shown in FIG. 2, in practice, there may be many client computers simultaneously accessing communication network 205. Communication network 205 is further coupled to a search engine server 204. Search engine server 204 is coupled to a search engine database 211. Client computer 201 sends a query 202 to search engine server 204 via communication network 205. In return from search engine server 204, client computer 201 receives a search result 203, corresponding to data located in search engine database 211. Query 202 may contain various combinations of characters, for example, alphanumeric or ASCII entities. It should be appreciated that query 202 also may include non-alphanumeric, graphic-based entities including, but not limited to, bit-mapped graphic images. It should also be appreciated that although the following description uses examples with lowercase alphanumeric characters, the present invention may be capable of discerning lowercase with uppercase alphanumeric characters.

Search engine server 204 is coupled to a query log database 206. Query log database 206 is coupled to a QCluster computer 207. Query log database 206 stores query 202 into a database comprising all received queries from client computer 201. QCluster computer 207 also is coupled to an editorial database 210 and to search engine server 204. Upon receiving query 202 from query log database 206, QCluster computer 207 compares existing clusters 208 stored in editorial database 210 with query 202. QCluster computer 207 will provide updated clusters 213 to editorial database 210, depending on a degree of commonality between query 202 and existing clusters 208 in editorial database 210. If query 202 satisfies the predetermined degree of commonality with an existing clusters 208, query 202 will be added to the subject cluster. If, on the other hand, query 202 does not satisfy the predetermined degree of commonality with an existing clusters 208, query 202 will create a new cluster. QCluster computer 207 may then export a topic 209 from editorial database 210. Topic 209 will be a member (i.e., word or phrase) of a cluster in editorial database 210. When query 202 satisfies the predetermined degree of commonality with an existing clusters 208, topic 209 may be a member of the existing cluster. When query 202 does not satisfy the predetermined degree of commonality with an existing clusters 208, topic 209 may be query 202.

Once topic 209 has been determined, QCluster computer 207 may then provides topic 209 to search engine server 204 in the form of a modified query 210. Search engine server 204 conducts a search of modified query 210 in search engine database 211. Search engine computer 205 then provides a search result 203 to server computer 204. Server computer 204 then provides search result 203 to client computer 201 via communication network 205. Alternatively, QCluster computer 207 provide the results of its clustering process directly to search engine database 211. In this case, QCluster computer 207 sends updated cluster and modified query 212 to search engine database 211. In this way, search engine database 211 may be capable of modifying the query for the next time the same query 202 is received, without needing the services of editorial database 210. This alternate path is shown dashed in FIG. 2.

QClustering Operation

Figure 3:
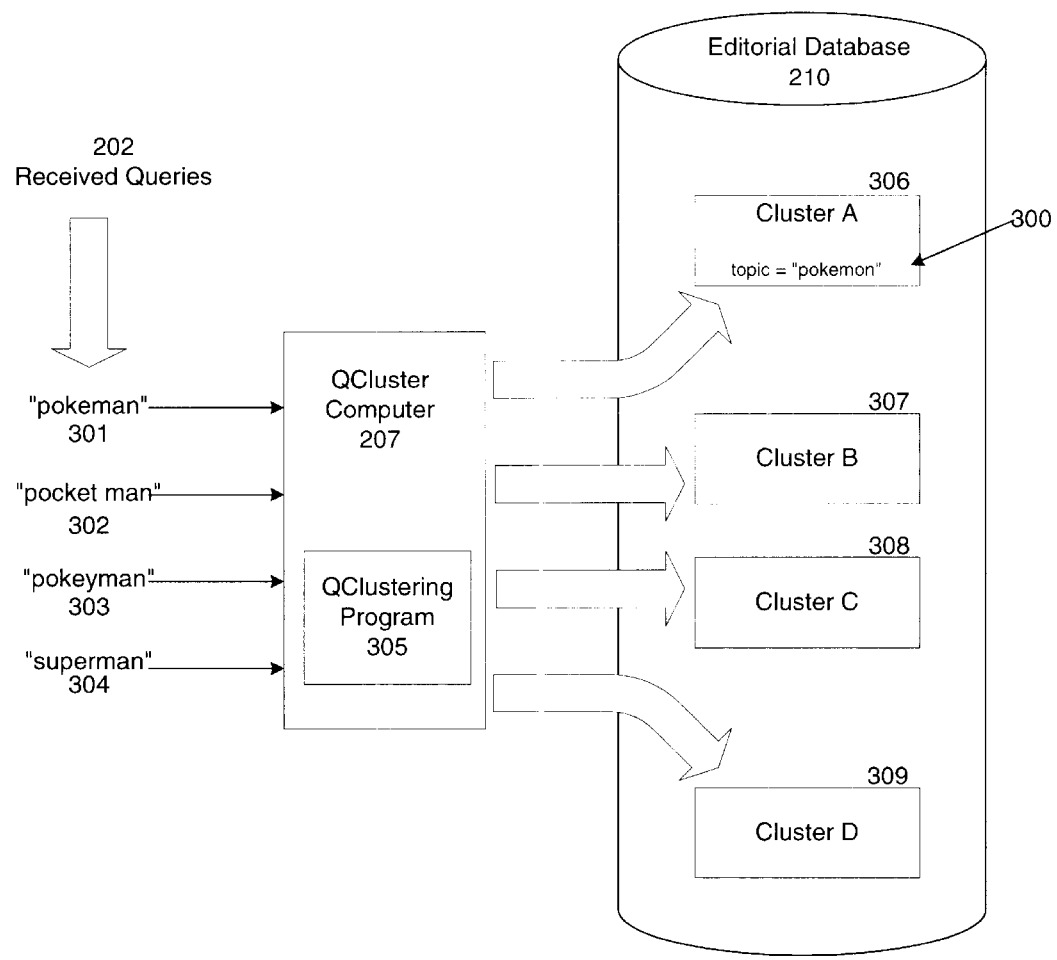
FIG. 3 is a block diagram illustrating a comparison of received queries and clusters of information in a database, according to the present invention.

FIG. 3 is a block diagram illustrating a comparison of received queries and clusters of information in a database, according to the invention. Specifically, FIG. 3 details comparison 208 of query 202 to the contents of editorial database 210, as conducted by QCluster computer 207. As shown in FIG. 3, QCluster computer 207 may receive multiple queries 202. In the example shown in FIG. 3, four queries are present: "pokeman" 301, "pocket man" 302, "pokeyman" 303, and "superman" 304. As received queries 301–304 enter QCluster computer 207, they are processed by a QClustering program 305, stored on QCluster computer 207. As will be discussed in more detail with reference to FIGS. 4–7, QClustering program 305 compares the contents of editorial database 210 with received queries 301–304.

The contents of editorial database 210 may include multiple groups or "clusters" of information, for example, cluster A 306, cluster B 307, cluster C 308, and cluster D 309. Although four clusters 306–309 are shown in FIG. 3, it should be appreciated that there may be any number of clusters located in editorial database 210. Each cluster is composed of individual members (e.g., words or phrases) that previously were received as queries 202. Specifically, each query 202 that is inputted by client computer 201 becomes a member of one or more clusters located in editorial database 210. For example, because "pokemon" 300 already is a member of cluster A 306, it can be assumed that "pokemon" 300 was a previous query 202.

Each cluster 306–309 may also designate at least one of its members to be a topic name. A topic name is one or more words or phrases that describe all members! of the cluster. Selection of a particular topic may be based on any number of factors including, but not limited to, the frequency with which a particular member is entered as a query and a predetermined user designation. In the example shown in FIG. 3, "pokemon" 300 is the topic for cluster A 306 because it is the only member of cluster A 306. However, if another of cluster A's 306 members, for example "pokeman" 301, was queried by users more often than "pokemon" 300, "pokeman" 301 may become the topic for cluster A 306. Alternatively, a database manager may predetermine that "pokemon" 300 will remain the topic for cluster A 306, regardless of the frequency of other queries. Selection of the topic will be discussed further with reference to FIG. 10.

Figure 4:
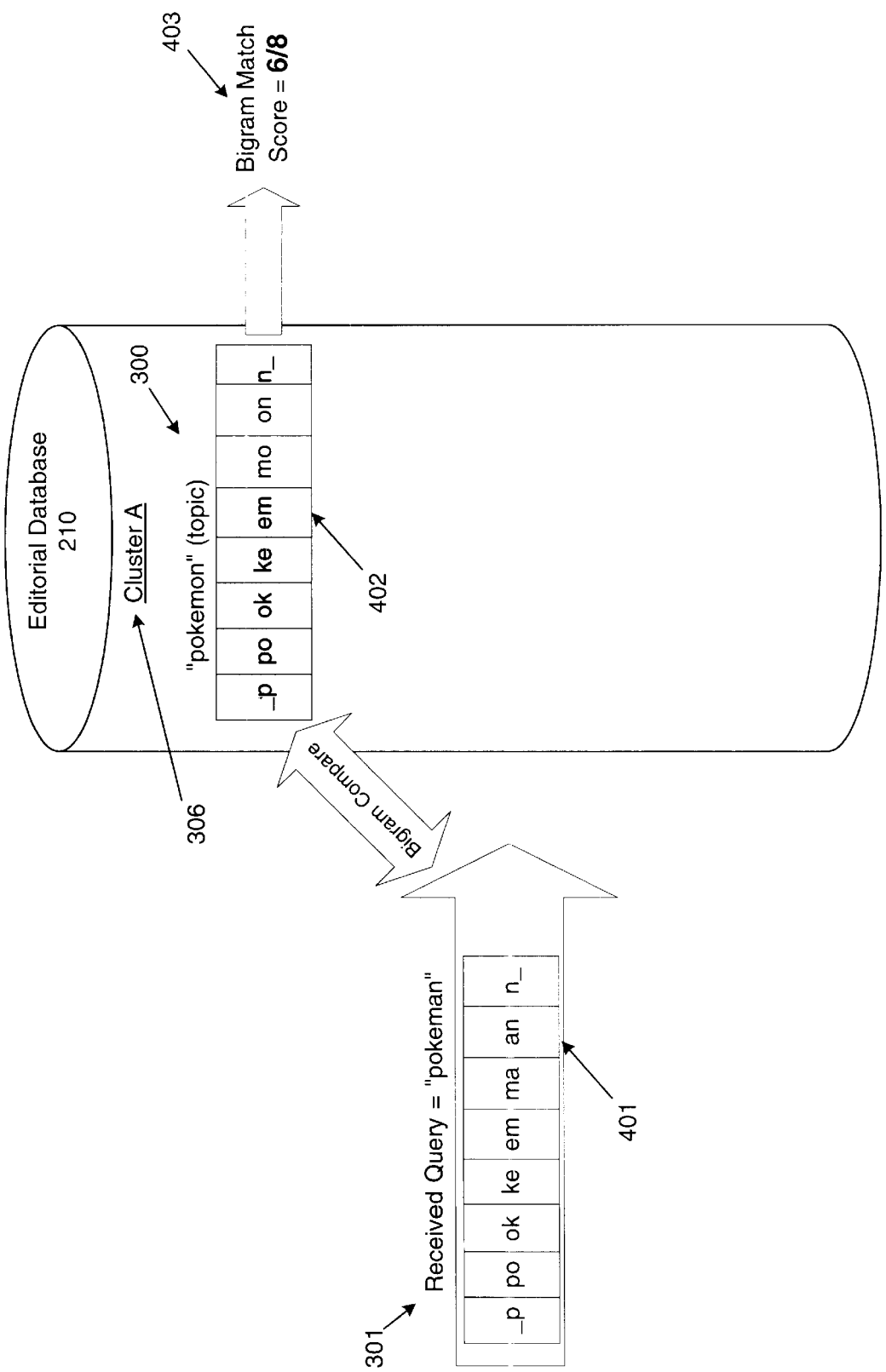
FIG. 4 is an example comparison of a received query with a cluster of information using bigram matching, according to the present invention.

As received queries 301–304 enter QCluster computer 207, QClustering program 305 compares the members of clusters 306–309 with received queries 301–304 to determine which cluster will house each query 301–304. QClustering program 305 may compare received query 301–304 with the members of clusters 306–309 using any number of techniques. FIGS. 4–7 show one such method for comparing received queries 301–304 to the contents of editorial database 210, called "bigram matching." Bigram matching is a technique that segments each word or phrase to be compared into a plurality of character sets. Each character set includes two adjacent characters of the subject word. For example, as shown in FIG. 4, received query "pokeman" 301 has the following character sets:

"_p";
"po";
"ok";
"ke";
"em";
"ma";
"an";
"n_";

Notably, the bigram character sets include spaces (i.e., "_") at the beginning and end of each word. This bigram segmenting is accomplished for received queries 301–304, as well as members of clusters 306–309. Although FIGS. 4–7 illustrate the comparison of received queries 301–304 with the members of clusters 306–309 using bigram matching, it should be appreciated that any n-gram matching may be conducted, for example, trigram or quadgram. It should also be appreciated that the invention may conduct the comparison of received queries 301–304 with the members of clusters 306–309 using other matching techniques.

Before comparing received queries 301–304, QCluster computer 207 may conduct a number of operations on received queries 301–304 to facilitate the matching process. For example, QCluster computer 207 may normalize received queries 301–304. Such normalization may include "stemming." Stemming describes the process of removing from words common suffixes or prefixes that are insignificant to the matching process (e.g., "ing," "ed," and "un"). Normalization also includes the process of removing from phrases whole words or phrases that are commonly found in a particular database, and thus are insignificant to the matching process (e.g., "www." and ".com"). Thus, normalization may also include the removal of "stop-words" by Qcluster computer 207. Stop-words are words commonly found in a certain language that have little significance to the information stored in a database (e.g., "a" and "the").

FIG. 4 is an example comparison of a received query with a member of a cluster using bigram matching, according to the invention. Specifically, FIG. 4 shows the comparison of received query "pokeman" 301 with topic "pokemon" 300, where other received queries 302–304 have not yet been considered by QClustering program 305. As shown in FIG. 4, received query "pokeman" 301 is divided into bigram 401 and compared with bigram 402 of topic "pokemon" 300, located in cluster A 306. Matching character sets of bigram 402 are shown highlighted. The highlighted matching character sets of bigram 402 include "_p", "po", "ok", "ke", "em", "n_". Once bigram 401 for received query "pokeman" 301 is compared with bigram 402 of topic "pokemon" 300, a bigram match score 403 maybe determined. Here, bigram match score 403 for bigram 401 and bigram 402 has a value of 6/8. This means that six of a possible eight character sets of bigram 402 matched bigram 401 for received query "pokeman" 301. Although the bigram match score has been described as a fraction of matching bigrams within the entire domain, it should be appreciated that other scoring techniques may be used to determine the bigram match score.

Whether a certain bigram match score is sufficient to cause a received query to be added to a particular cluster will depend on a predetermined required bigram match score. For example, as shown in FIG. 4, bigram match score 403 likely is sufficient to satisfy a predetermined threshold value for adding received query "pokeman" 301 to Cluster A 306. Also a bigram match score may be weighted by certain considerations, before determining whether received query 301 will be added to a particular cluster. For example, a bigram match score may be weighted based on the length of a received query and/or the length of the member contained in the cluster. In this way, the invention ensures that the final matching score will not be unduly influenced by high bigram match scores caused by longer queries matched against shorter members. For example, the following formula may be used to determine the final match score:

$$\text{Final Match Score} = \text{bigram match score} \times \sqrt{(L1 \times L2)}$$

L1=length of query
L2=length of cluster member

In addition to weighting the bigram match score based on the length of the query or cluster member, the bigram match score may be weighted based on characteristics of the individual character sets. This weighting recognizes that certain bigram character sets appear less than others, and thus likely are more significant and should be given greater weight. For example, in FIG. 4, matching character set "ke" may be so rare that its very presence signals that the query should be clustered with the matching member. This weighting may be accomplished in QCluster computer 207 by QClustering program 305. Although two examples of weighting were discussed, it should be appreciated that there may be many other weighting techniques, based on the characteristics of the query or cluster members.

QClustering Program 305 also may be used to associate certain clusters to text-based documents or entire Internet web sites, so that, conceptually, the terms in the clusters attached to a document are associated with the document. For example, if a particular site or document is attached to pokemon Cluster A 305, and Cluster A 305 contains terms such as pokeman 301 (as shown in FIG. 4), it is as if the term pokeman occurs in the searchable terms in the document or site itself. Therefore, when a user issues a query with the wrong spelling (i.e., pokeman, instead of pokemon), he/she is directed to this site because the wrong spelling (i.e., pokeman) is in the cluster associated with the site.

Figure 5:
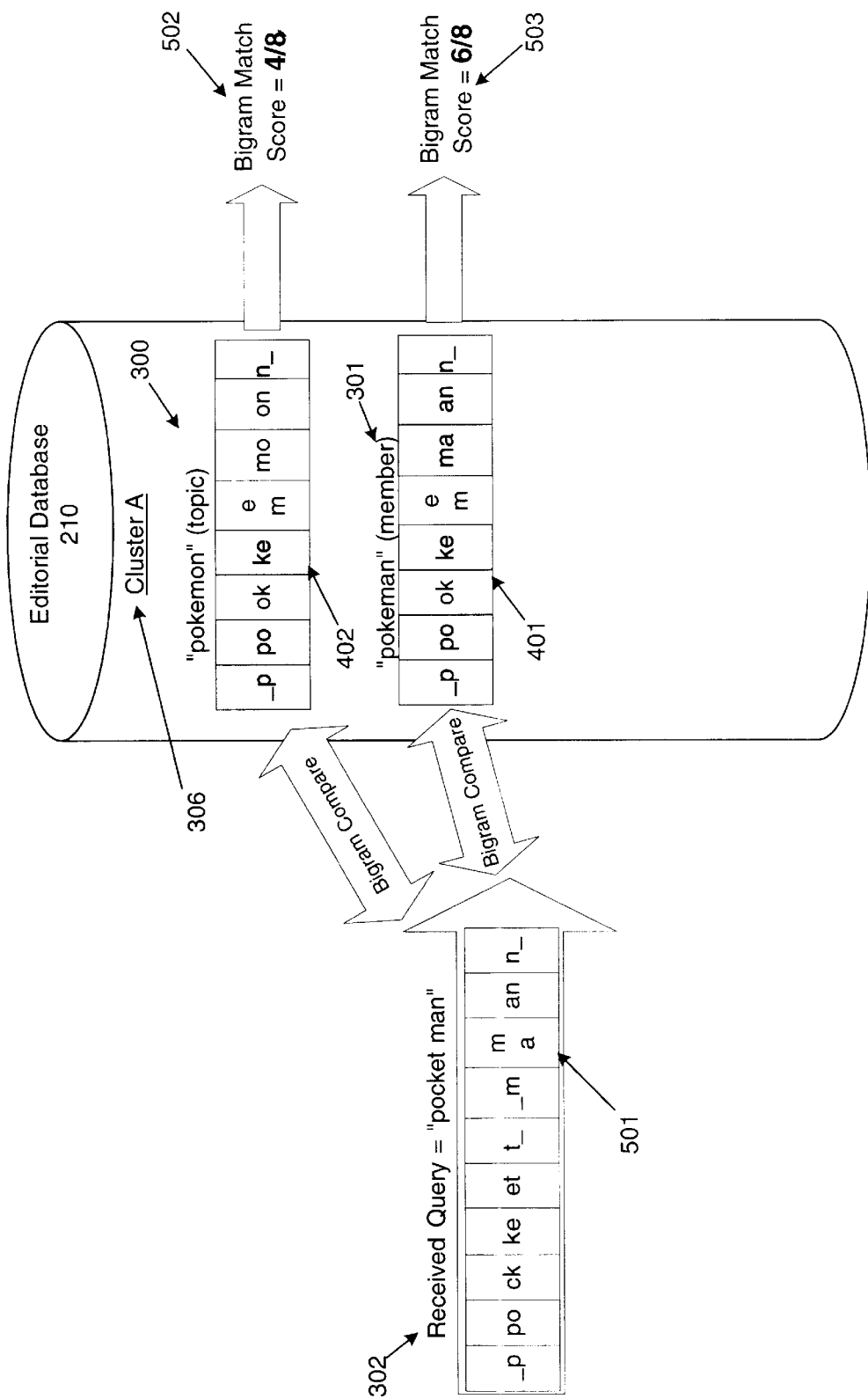
FIG. 5 is another example comparison of a received query with a cluster of information using bigram matching, according to the present invention.

FIG. 5 is another example comparison of a received query with members of a cluster using bigram matching. Specifically, FIG. 5 shows the comparison for received query "pocket man" 302. In this example, "pokemon" 300 remains the topic for cluster A 306. Also, received query "pokeman" 301, which was compared in FIG. 4, has been added to cluster A 306, thus indicating that the final match score of received query 301 "pokeman" was sufficient to become a member of cluster A 306 with topic "pokemon" 300. Other received queries 303 and 304 have not yet been considered by QClustering program 305.

As shown in FIG. 5, received query "pocket man" 302 is segmented into a bigram 501. Bigram 501 is then compared both to bigram 402 for topic "pokemon" 300 and also to bigram 401 for member "pokeman" 301. Although FIG. 5 shows the received query compared both to the cluster's topic and to its members, it should be appreciated that the invention may compare the received query to members only, or to the cluster's topic and any predetermined number of members. Received query "pocket man" 302 results in a bigram match score 502 of 4/8 with "pokemon" 300, and a bigram matched score 503 of 6/8 with "pokeman" 301. As discussed with reference to FIG. 4, the bigram match score determines whether a received query will be added to a particular cluster. Specifically, whether received query "pocket man" 302 is added to cluster A 306 will depend on whether bigram match scores 502 and 503 satisfy a predetermined threshold value. Also, as discussed with reference to FIG. 4 for bigram match score 403, bigram match scores 502 and 503 may be weighted to arrive at a final match score.

Figure 6:
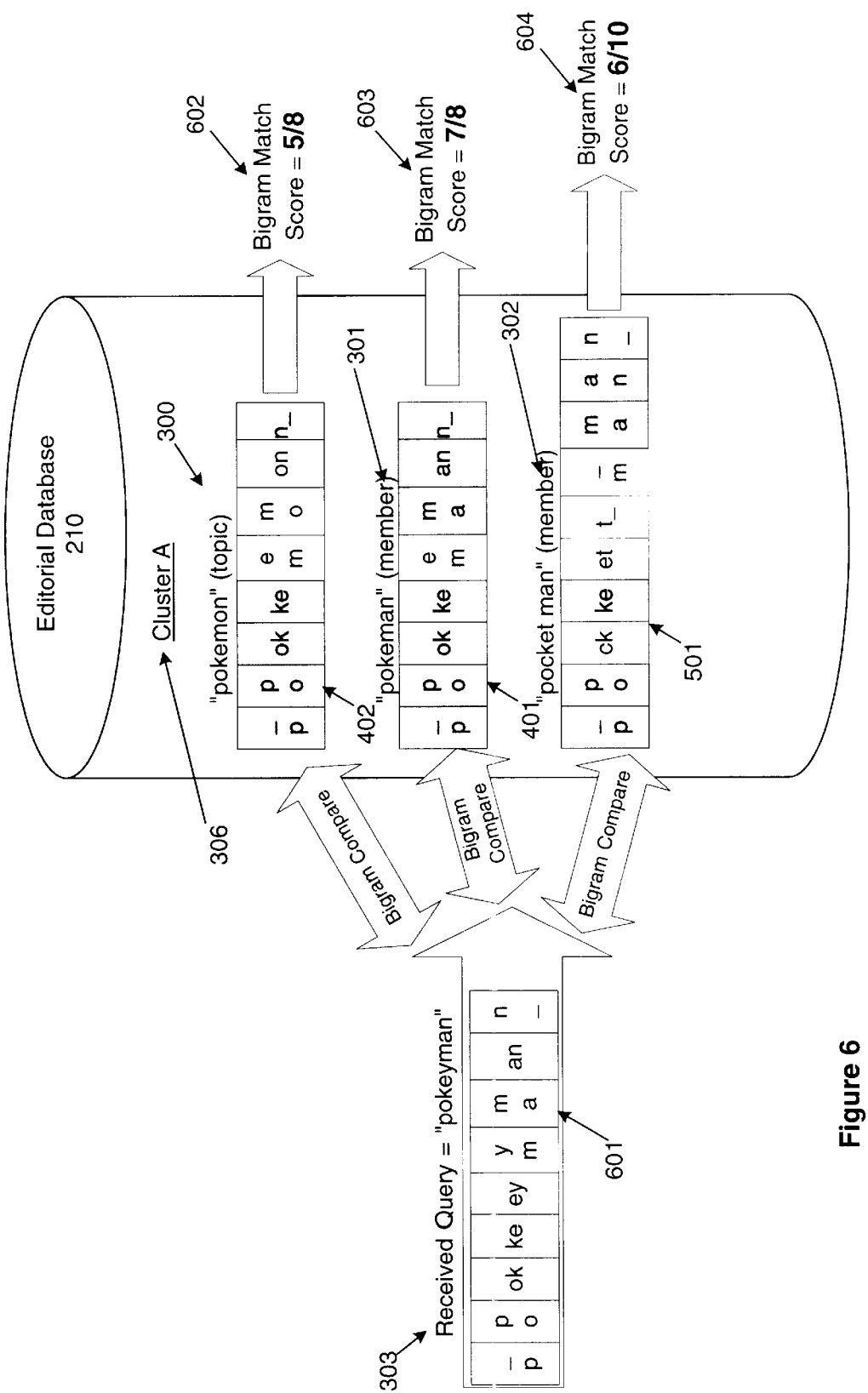
FIG. 6 is another example comparison of a received query with a cluster of information using bigram matching, according to the present invention.

FIG. 6 is another example comparison of a received query with members of a cluster using bigram matching. Specifically, FIG. 6 shows the comparison for received query "pokeyman" 303. In this example, "pokemon" 300 remains the topic for cluster A 306. Also, received query "pokeman" 301, compared in FIG. 4, and received query "pocket man" 302, compared in FIG. 5, have become members of Cluster A 306. Therefore, FIG. 6 assumes that the final match score for received query "pokeman" 301 and received query "pocket man" 302 were sufficient to make the queries members of cluster A 306 with topic "pokemon" 300. Other received query 304 has not yet been considered by QClustering program 305.

As shown in FIG. 6, received query "pokeyman" 303 is segmented into a bigram 601. Bigram 601 is then compared to bigram 402 for topic "pokemon" 300, bigram 401 for member "pokeman" 300, and bigram 501 for member "pocket man" 302. Received query "pokeyman" 303 results in a bigram match score 602 of 5/8 for topic "pokemon" 300, a bigram match score 603 of 7/8 for member "pokeman" 301, and a bigram match score 604 of 6/10 for member "pocket man" 302. Although FIG. 6 shows received query 303 "pokeyman" being compared with each member 301, 302 and each topic 300 of Cluster A 306, it should be appreciated that the present invention may compare received query 303 "pokeyman" with any one or more of the members 301, 302 or topics 300 of Cluster A 306. As discussed with reference to FIG. 4, the bigram match score determines whether a received query will be added to a particular cluster. Specifically, whether received query "pokeyman" 303 is added to cluster A 306 will depend on whether bigram match scores 602–604 satisfy a predetermined threshold value.

Also, as discussed with reference to FIG. 4 for bigram match score 403, bigram match scores 602–604 may be weighted to arrive at a final match score.

Figure 7:
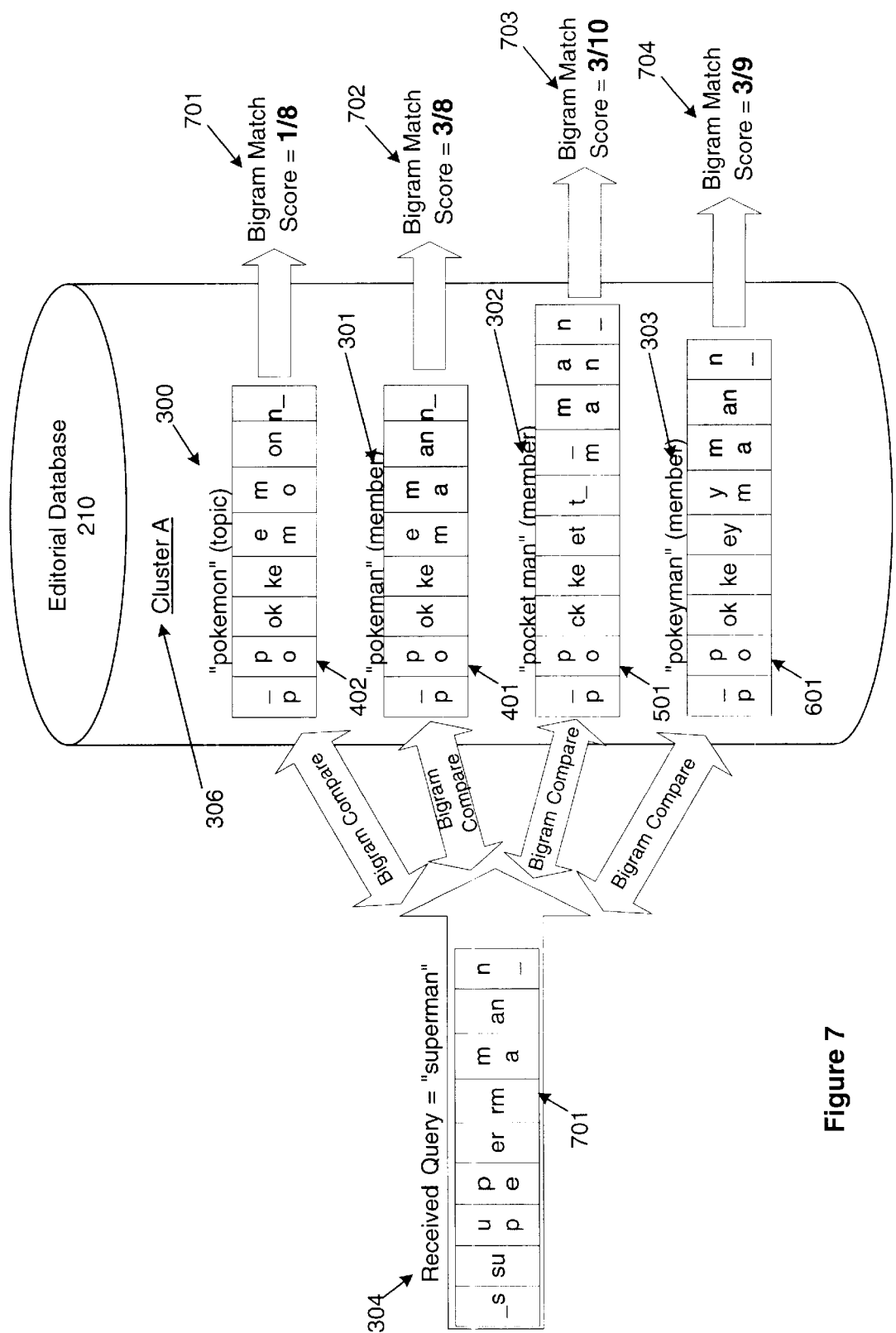
FIG. 7 is another example comparison of a received query with a cluster of information using bigram matching, according to the present invention.

FIG. 7 is another example comparison of a received query with members of a cluster using bigram matching. Specifically, FIG. 7 shows the comparison for received query "superman" 304. In this example, "pokemon" 300 remains the topic for cluster A 306. Also, received query "pokeman" 301, compared in FIG. 4, received query "pocket man" 302, compared in FIG. 5, and received query "pokeyman" 303, compared in FIG. 6, have become members of Cluster A 306. Therefore, FIG. 7 assumes that the final match score for received query "pokeman" 301, received query "pocket man" 302, and received query "pokeyman" 303, were sufficient to make the queries members of cluster A 306 with topic "pokemon" 300.

As shown in FIG. 7, received query "superman" 304 is segmented into a bigram 701. Bigram 701 is then compared to bigram 402 for topic "pokemon" 300, bigram 401 for member "pokemon" 300, bigram 501 for member "pocket man" 302, and bigram 601 for member "pokeyman" 303. Received query "superman" 304 results in a bigram match score 701 of 1/8 for topic "pokemon" 300, a bigram match score 702 of 3/8 for member "pokeman" 301, a bigram match score 703 of 3/10 for member "pocket man" 302, and a bigram match score 704 of 3/8 for member "pokeyman" 303. Although FIG. 7 shows received query "superman" 304 being compared with each member and each topic 300 of Cluster A 306, it should be appreciated that the present invention may compare received query "superman" 304 with. any one or more of the members 301–303 or topics 300 of Cluster A 306. As discussed with reference to FIG. 4, the bigram match score determines whether a received query will be added to a particular cluster. Specifically, whether received query "superman" 304 is added to cluster A 306 will depend on whether bigram match scores 701–704 satisfy a predetermined threshold value. Also, as discussed with reference to FIG. 4 for bigram match score 403, bigram match scores 701–704 may be weighted to arrive at a final match score. Notably, bigram match scores 701–704 for received query "superman" 304 are much lower than for previous queries 300–303, and thus received query "superman" 304 is less likely to be added to cluster A 306.

Figure 8:
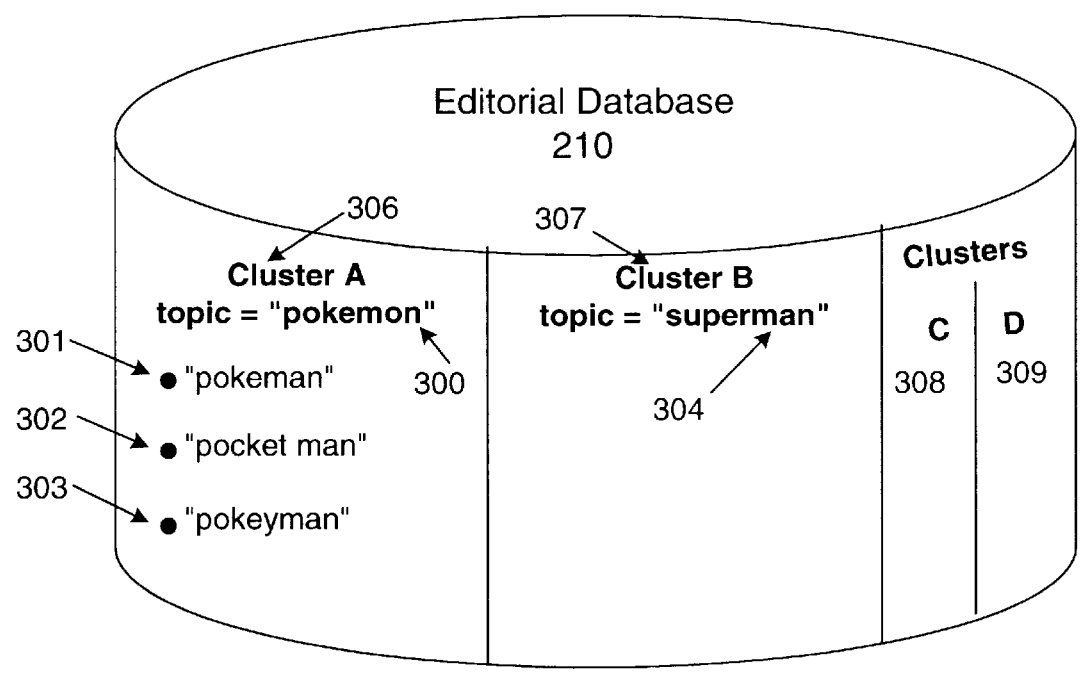
FIG. 8 illustrates the content of various clusters in a database corresponding to the example comparisons of FIGS. 4–7.

FIG. 8 illustrates the contents of editorial database 210 following the clustering of received queries 301 through 304, as discussed with reference to FIGS. 4–7. As shown in FIG. 8, Cluster A 306 has three members "pokeman" 301, "pocket man" 302, and "pokeyman" 303. Cluster A 306 also has a topic "pokemon" 300. Cluster B 307 includes "superman" 304, thus indicating that bigram match scores 701–704 for "superman" 304 were insufficient to satisfy the predetermined threshold for adding it to Cluster A 306. Although not shown, it should be appreciated that as additional queries 202 are received they may be added to Cluster A 306, Cluster B 307, Cluster C 308 or Cluster D 309. Moreover, additional clusters (not shown) may be added as additional queries fail to meet the predetermined threshold for existing clusters.

Also, it should be appreciated that the invention may be used to amalgamate existing clusters. For example, it may be that as more members are added to Cluster A 306 and Cluster C 308 their differences become insignificant. Alternatively, it may be that Cluster A 306 was generated using the invention, but Cluster C 308 was created by some other method (e.g., manually) and blindly inputted to editorial database 210. As a result, Cluster C 308 may be merged with Cluster A 306. In this case, the newly merged cluster may adopt Cluster A's 306 topic name, Cluster C's 308 topic name, or keep both topic names. Therefore, the invention may be used to create individual clusters, as well as amalgamating whole clusters.

Figure 9:
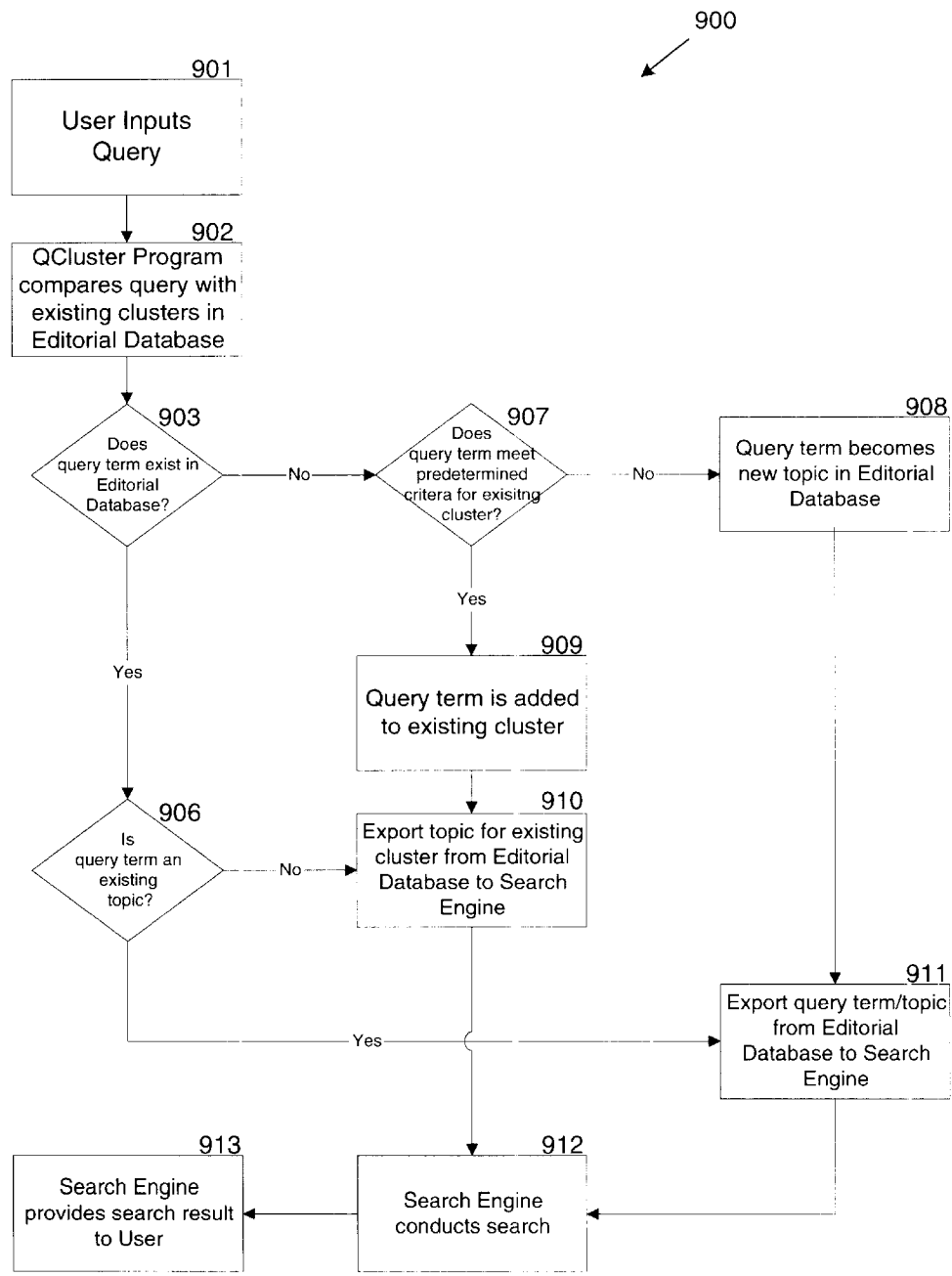
FIG. 9 is a flow diagram of a method for clustering a query in a database, according to the present invention.

FIG. 9 provides a flow diagram 900 of a method for clustering a query in a database. In step 901, a user inputs a query 202. In step 902, QCluster program 305 compares inputted query 202 with clusters existing in editorial database 210 (see FIGS. 4–7). In step 903, it is determined whether query 202 exists in editorial database 210. If query 202 does not exist in editorial database 210, method 900 moves to step 907 to determine whether query 202 meets a predetermined criteria for clusters existing in editorial database 210. If the query 202 does not meet predetermined criteria for an existing cluster in step 907, query 202 becomes a new member in a new cluster in editorial database, in step 908. Process 900 then moves to step 911 where query 202, which has been designated as a topic in step 908, is exported from the editorial database 210 to search engine server 204, in step 911. In step 912, search engine server 204 conducts a search based on exported query 202, and in step 913 search engine server 204 provides search result 203 to the user.

If, on the other hand, query 202 meets the predetermined criteria for an existing cluster in step 907, query 202 is added to that existing cluster in step 909. In step 910, the topic for the existing cluster whose predetermined criteria query 202 has satisfied is exported from editorial database 210 to search engine server 204. Search engine server 204 then conducts a search in step 912 and provides search result 203 to the user in step 913.

In step 903, if query 202 exists in editorial database 210, step 906 determines whether query 202 is a topic for an existing cluster. In step 910, if query 202 is not a topic, the topic for the existing cluster is exported from editorial database 210 to search engine server 204. In step 912, search engine server 204 conducts a search based on exported query 202, and in step 913 search engine server 204 provides search result 203 to the user. If, on the other hand, step 906 determines that query 202 is an existing topic, in step 911 query/topic 202 is exported from editorial database 210 to search engine server 204. In step 912, search engine server 204 then conducts a search based on exported query 202, and in step 913, search engine server 204 provides search result 203 to the user.

Figure 10:
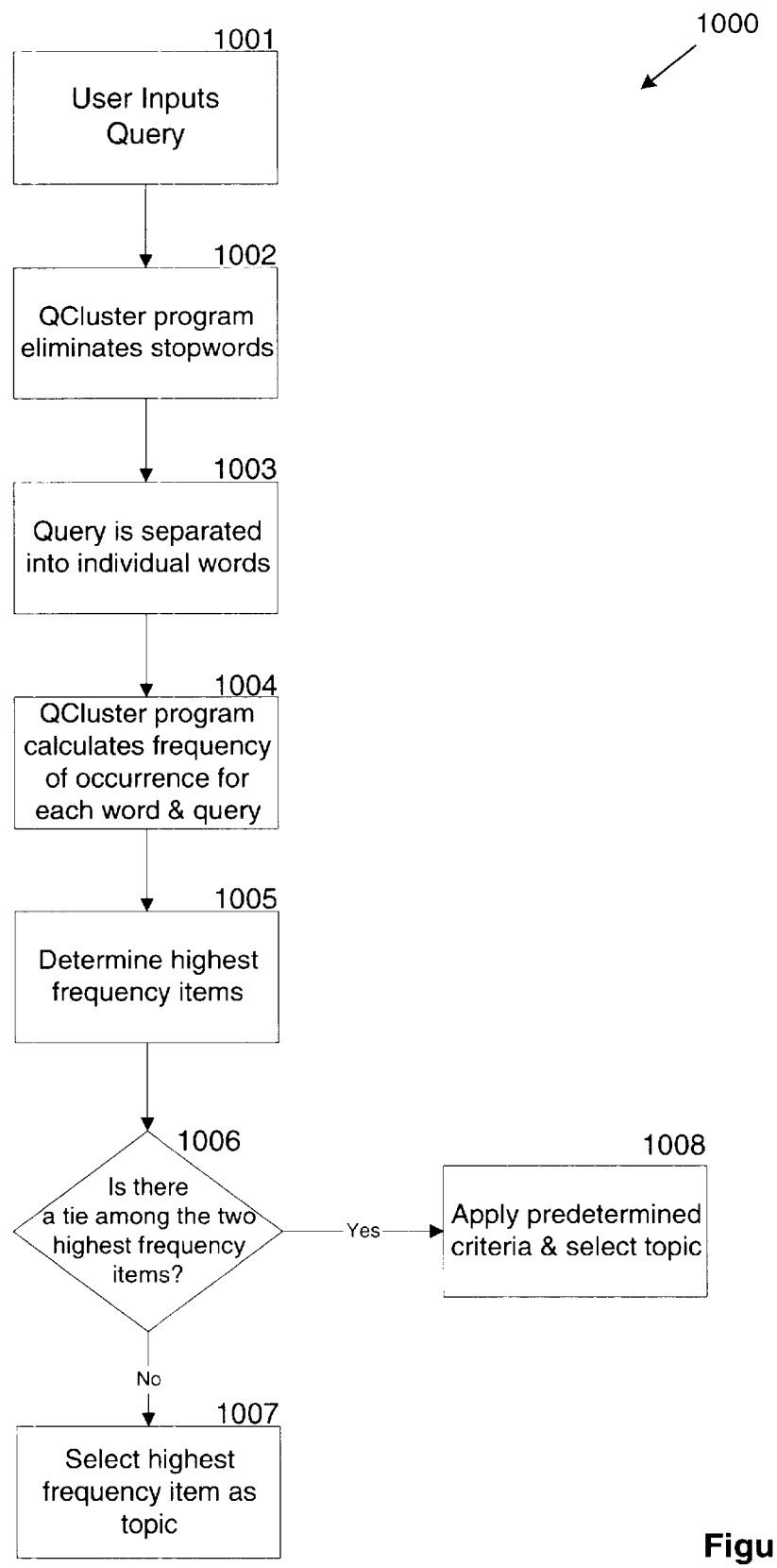
FIG. 10 is a flow diagram of a method for selecting a topic, according to the present invention.

FIG. 10 is a flow diagram 1000 of one method of selecting a topic, in accordance with the invention. It should be appreciated that the invention is not limited to the disclosed method. In fact, the invention may encompass other methods of selecting a topic from a collection of clustered items. In step 1001, a user inputs a query 202. Query 202 may be a word or series of words. In step 1002, QCluster Program 305 eliminates stopwords. Stopwords are words that do not have a particular significance in the context of the task at hand. For example, because of their prevalence in the context of Internet searching, the terms "www." and ".com" are considered stop words, and are thus eliminated from topic selection consideration. In step 1003, the query is separated into individual words.

In step 1004, QCluster Program 305 may calculate the frequency of the occurrence of the individual words and whole query. In step 1005, the highest frequency words and queries are determined, based on step 1004. The precise number of selected highest frequency "items" (i.e., words and/or queries) may vary, depending on the relative scores. For example, the two highest frequency items may be selected when their frequency scores are relatively close. On the other hand, only one highest frequency item may be selected, where the subject item has a frequency score that is significantly higher than the second highest frequency item. If two or more highest frequency items are selected, it is determined whether the items have the same frequency score, in step 1006. If the scores are not the same, the highest frequency item may be selected as the topic. Alternatively, a predetermined number of highest frequency items may be selected to be the topics. If the highest frequency items have the same frequency score, a predetermined criterion may be used to break the tie, in step 1008. For example, it may be that the longest item (i.e., the item with the most characters) is selected as the topic. Notably, if none of the items satisfy a predetermined minimum threshold to become a topic, it may be that the longest item is selected to be the topic of the cluster.

The invention is directed to a system and method for classifying a character string from database entries, but is not limited to database information, regardless of any specific description in the drawing or examples set forth herein. Moreover, it should be appreciated that the invention is not limited to clustering information anew, but also may be adapted to merging existing clusters of information. It will be understood that the present invention is not limited to use of any of the particular components or devices herein. Indeed, this invention can be used in any application that requires the categorization of words or phrases, including spell-checking software, for example. Further, the system disclosed in the present invention can be used with the method of the present invention or a variety of other applications.

While the invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the invention may be made in the form and details of these embodiments without departing from the true spirit and scope of the invention as defined by the following claims.

What is claimed is:

1. A method for merging clusters of words and phrases, comprising:

selecting a first topic name for a first cluster of words and phrases;

selecting another topic name for another cluster of words and phrases;

comparing said first topic name to said another topic name;

merging said first cluster with said another cluster, when said first topic name and said another topic name satisfy a predetermined level of commonality.

2. The method of claim 1, wherein said selection of said first and said another topic name further comprise determining a frequency of said words or phrases in said clusters, wherein said first and said another topic names satisfy a predetermined level of frequency in said clusters.

3. The method of claim 1, wherein said comparing further comprises segmenting said first topic name into a first plurality of character sets and said another topic name into another plurality of character sets, and comparing said first plurality of character sets with said another plurality of character sets.

4. The method of claim 3, wherein each of said character sets comprise more than one adjacent characters of said character string.

5. A method for classifying information, comprising:

receiving at least one character string, wherein each character string comprises a word or a phrase;

segmenting a first character string into a first plurality of character sets and a another character string into another plurality of character sets, wherein each of said character sets comprise more than one adjacent characters of said character string;

comparing said first plurality of character sets with said another plurality of character sets;

clustering said first character string with said another character string into a group, when said first character set satisfies a predetermined degree of commonality with said another character set;

creating another group when said first character set does not satisfy said predetermined degree of commonality with said another character set;

selecting at least one of said character strings in each of said groups to be a topic, based on a frequency of said character strings with said groups; and outputting said topic.

6. The method of claim 5, wherein said character string is received via a communication network.

7. The method of claim 6, wherein said communication network is the Internet.

8. The method of claim 5, wherein said character sets comprise combinations of two adjacent characters.

9. The method of claim 5, wherein said character sets include a blank character at a beginning of said word or phrase.

10. The method of claim 5, wherein said character sets include a blank character at an end of said word or phrase.

11. The method of claim 5, wherein said comparing further comprises comparing each character set in said first plurality of character sets to each character set in said second plurality of character sets.

12. The method of claim 5, wherein said predetermined degree of commonality is a function of the number of matching character sets between said first character set and said second character set.

13. The method of claim 5, wherein said topic is outputted to a database search engine.

14. The method of claim 5, wherein said topic is outputted to an electronic spell checking application.

15. The method of claim 5, wherein said topic is outputted to an electronic thesaurus application.

16. The method of claim 5, wherein said topic is a predetermined character string.

17. The method of claim 5, wherein said topic is a character string that is received more than other character strings.

* * * * *

UNITED STATES PATENT AND TRADEMARK OFFICE
CERTIFICATE OF CORRECTION

PATENT NO.   : 6,578,032 B1
DATED        : June 10, 2003
INVENTOR(S)  : Chandraesekar et al.

It is certified that error appears in the above-identified patent and that said Letters Patent is hereby corrected as shown below:

<u>Column 7,</u>
Line 6, please delete "!" after the word "members"

<u>Column 10,</u>
Line 31, please delete "." after the word "with"

Signed and Sealed this

Thirteenth Day of January, 2004

JON W. DUDAS
*Acting Director of the United States Patent and Trademark Office*